United States Patent
Trueblood

[11] Patent Number: 6,077,024
[45] Date of Patent: Jun. 20, 2000

[54] CARGO LOADING AND UNLOADING SYSTEM FOR TRUCKS

[76] Inventor: Gerald K. Trueblood, 1501 La Madrona Dr., Santa Cruz, Calif. 95060

[21] Appl. No.: 09/090,962

[22] Filed: Jun. 4, 1998

[51] Int. Cl.[7] .................................................. B60P 1/32
[52] U.S. Cl. ...................... 414/462; 414/498; 298/1 A; 224/404
[58] Field of Search ............. 298/1 A; 414/462, 414/499; 224/402, 403, 404

[56] References Cited

U.S. PATENT DOCUMENTS

| | | | |
|---|---|---|---|
| 2,215,529 | 9/1940 | Nazarko | 414/498 |
| 2,369,722 | 2/1945 | Dempster | 414/498 |
| 3,450,437 | 6/1969 | McQueen | 298/1 A |
| 4,225,281 | 9/1980 | Bibeau et al. | 414/498 |
| 4,647,110 | 3/1987 | McKee | 298/1 A |
| 4,741,575 | 5/1988 | Sloan | 414/498 |

Primary Examiner—Gregory A. Morse
Attorney, Agent, or Firm—Donald R. Boys

[57] ABSTRACT

A modular cargo system for a truck-style vehicle includes a cargo box having demountable pivot points on opposite sides near the front and bottom. Translating drives move along opposite sides of the truck bed and carry translating pivot blocks. Each translating pivot block has a pivotally-connected dual-link mechanism also pivotally connectable at the opposite ends to the demountable pivot points on the cargo box. The dual link mechanisms are of a length to allow the cargo box to sit on the ground behind the truck bed with the translating blocks moved near the tail end of the truck bed. By moving the translating blocks toward the cab end of the truck bed, the dual-link mechanisms articulate at an approximate end point, and the lower links are adapted to guide over the tail end of the truck bed while raising the front end of the cargo box in a manner that the front end of the cargo box clears the tail end of the truck bed. Further movement toward the cab end pulls the cargo box up into the truck bed. Mechanisms are provided for folding the link mechanisms so the cargo box may be fully boarded, and for ejecting the cargo box in several different ways.

25 Claims, 15 Drawing Sheets

CARGO LOADING AND UNLOADING SYSTEM FOR TRUCKS

FIELD OF THE INVENTION

The present invention is in the field of loading and unloading systems for trucks and other like vehicles, and pertains more particularly to methods and apparatus for loading and unloading cargo boxes.

BACKGROUND OF THE INVENTION

Pickup trucks and vans have been and continue to be the one of the most popular vehicles sold in the United States. The chief reasons for continued popularity may vary from owner to owner, however, the ability to effectively and economically haul various cargo loads ranks high among typical truck buyers.

There are many different types of trucks on the market that are capable of hauling cargo. Among these are certain models that are capable of automatic unloading of cargo. An example is a standard dump truck. Various types and sizes of dump trucks are available from large commercial models to mini dump-truck models. Most are hydraulically operated, and involve raising the entire truck bed at an angle allowing cargo to spill out from a cargo bay.

More recently, cargo dumping systems have been developed wherein the dumping bay is separate from the pickup or dump truck and mechanically attatched thereto so that by automated method, a load may be dumped from the dumping bay without raising the truck bed. Such systems may be operated hydraulically, via electric-winch technique, or by manual crank method. Such systems are meant for smaller commercial users or sport utility owners. Low-end users often prefer this method over purchasing and maintaining an expensive hydraulic system typically found with larger dump trucks. One example of such a system taken from the prior art is taught in U.S. Pat. No. 5,267,779 which teaches a detachable cargo box dumper attatched via chain to a system of frames, rails and sprockets that are semi-permanently attatched to a parent vehicle. The system may be operated via hand crank or electric motor.

Often people have a need for hauling valuable cargo that they do not wish to dump on the ground. Therefore, systems have been provided to allow stowed cargo in separate boxes or bays to be removed from the truck bed and put on the ground for unloading and loading. This method is mainly employed by small commercial users who haul a variety of cargo and by non-commercial users who haul cargo such as camping gear, heavy furniture, or other valuable goods. In this way, goods may first be lowered to ground level where they are more easily unloaded. Similarly, loading the cargo box from ground level is easier than loading into the back of a typical pickup cargo area. Automated forklift or platform style tail-gate apparatus is typically added to a vehicle as an accessory for the purpose of raising such cargo boxes to the level of the truck bed where they may then be moved into the bed of the truck. Similarly, such automated platform tail-gates or forks may receive a loaded cargo box from inside the truck bed and then lower it to the ground.

One problem with the current art is that there is no flexibility for differing types of loaded cargo. For example, dumping style boxes are designed for gravel and other material wherein the material is dumped out from an angled position. Removal of such boxes for lying on the ground is only performed when the box is not in use and requires detaching the box from the bed of the truck. Moreover, separate cargo boxes wherein platform tail-gates or forklift style apparatus raise and lower them are not designed to dump material at an angle.

Another problem with the current art is that manual labor must be used to physically slide cargo boxes in and out of the bed of a truck even though they may be raised to a proper level via automation. Manual labor comprising lifting and so on must also be used when detaching current art dumping boxes because they are not designed with systems that enable complete lowering to the ground without detaching the box, as previously described. This sort of manual effort is not within the ability of many users of small trucks, and also may present a safety hazard for many.

What is clearly needed is a modular multi-purpose cargo system that allows automated dumping at an angle, ground level unloading, ground level loading, and retrieving back into a cargo area of a truck without requiring detachment of the cargo box. Such a system would reduce overall manual labor associated with the operation of current art systems, and also enhance reliability and safety.

SUMMARY OF THE INVENTION

In a preferred embodiment a modular cargo system for a truck-style vehicle having a bed with a length from a cab end to a tail end, and a width between first and second sides is provided, the cargo system comprising a cargo box having first and second sides substantially parallel with the direction of the length of the truck bed, a first box end disposed toward the cab end of the truck bed, a second box end facing in the direction of the tail end of the truck bed, and a bottom and a top, the cargo box adapted to fit within the length and width of the truck bed; a first linear translating drive mounted along the first side of the truck bed and adapted to translate a first pivot block along substantially the length of the truck bed; a first dual-link mechanism having a first link with a first and a second end, the first end of the first link pivotally mounted to the translating first pivot block, a second link having a first and a second end, the first end of the second link pivotally connected to the second end of the first link, and the second end of the second link pivotally connected to the first side of the cargo box adjacent the first box end facing toward the cab end of the truck bed and nearer the bottom of the cargo box than the top; a second linear translating drive mounted along the second side of the truck bed and adapted to translate a second pivot block along substantially the length of the truck bed; and a second dual-link mechanism mirroring the first dual link mechanism, and pivotally mounted to the translating second pivot block, and the second side of the cargo box opposite the pivotal mounting of the first dual link mechanism to the first side of the cargo box. The translating drives are adapted to translate the translating pivot blocks together in unison, the unfolded length of the dual link mechanisms is sufficient to allow the cargo box to rest horizontally at ground level behind the truck bed with the translating pivot blocks positioned at the tail end of the truck bed, and the second links of the dual link mechanisms are shaped such that as the translating drives move the translating pivot blocks toward the cab end from the tail end, the second links bear on the tail end of the truck bed, raising the cargo box until the first box end clears the tail end of the truck bed, and further translation toward the cab end of the truck bed pulls the cargo box over the tail end of the truck bed until the cargo box rests in the truck bed. In a preferred embodiment the translating drives are worm gear drives driven by electrical motors. The translating drives in some embodiments are adapted, after pulling the cargo box up into the truck bed, to translate toward the tail end with the cargo box stationary, and fold the dual link mechanisms to a predetermined position, and to then translate toward the cab end, pulling the cargo box maximally into the truck bed.

In some embodiments during the pulling-in with the dual-link mechanisms folded, a guide rail system is employed to ensure that the dual-link mechanisms remain folded. After the pulling-in with the dual-link mechanisms folded, the translating drives are adapted to move toward the tail end with the dual-link mechanisms folded, pushing the cargo box toward the tail end to a pre-determined position. After pushing the cargo box to the predetermined position with the dual-link mechanisms folded, the translating drives are adapted to move toward the cab end with the cargo box stationary, unfolding the dual-link mechanisms. After unfolding the dual-link mechanisms the translating drives are adapted to move toward the tail end, pushing the cargo box from the truck bed while maintaining the dual-link mechanisms unfolded. Guide tracks and follower blocks are used in some embodiments to constrain articulation of the linkages. In other embodiments clutch mechanisms at the translating blocks are used.

In some embodiments the range of folding of the dual-link mechanisms is intentionally limited. Also in some embodiments, mounting to the cargo box is by quick-release apparatus. In unloading, at least four different box positions are provided, these being flat on the ground, position for dumping, drawer position, and vertical position on the ground.

Methods for practicing the invention are also taught in the descriptions following. The apparatus and methods provide a unique and very useful system for adapting pickup trucks, vans, camper-shelled trucks and the like to serve as dump trucks and to easily load and unload cargo in boxes in a variety of ways.

BRIEF DESCRIPTION OF THE DRAWING FIGURES

DESCRIPTION OF THE PREFERRED EMBODIMENTS

Figure 1:
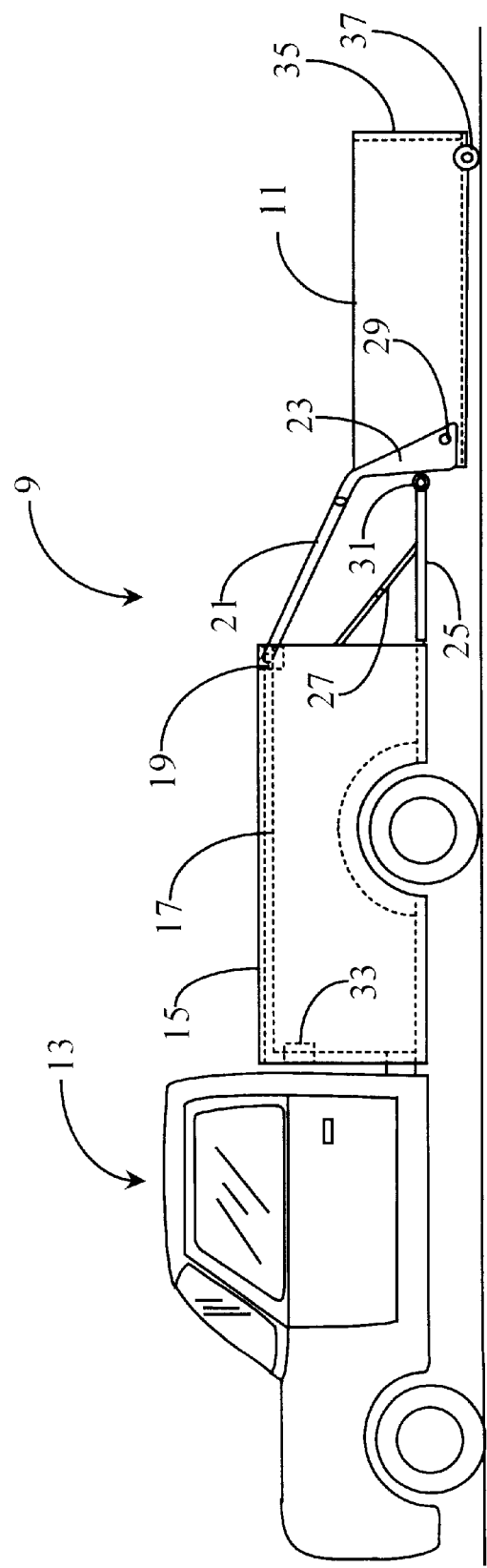
FIG. 1 is an elevation view of a multi-purpose cargo system installed in a pickup truck according to an embodiment of the present invention.

FIG. 1 is an elevation view of a modular, multi-purpose cargo system 9 installed in a pickup truck according to an embodiment of the present invention. Cargo system 9 is adapted to be modularly installed into a standard pickup truck 13 or in a van or other similar vehicle. Cargo system 9 comprises a detachable cargo box 11, a linear drive apparatus 17, which in this case is of the form of a worm-gear drive, and connecting hardware comprising a pair of shaped levers 23, and a pair of links 21. The lever and link on each side form a folding link mechanism for handling cargo boxes.

Cargo box 11 is adapted to fit securely and snugly into a cargo area or bed 15 of a standard pickup truck or van such as pickup truck 13. Cargo box 11 in a preferred embodiment is made from a tough polymer such as polyurethane. Other polymer-based materials such as may be known in the art may be used for cargo box 11 so long as the material is durable, shock resistant, heat resistant and lightweight. Polyurethane is given as an example material because of it's suitable attributes. In alternative embodiments other materials, such as wood, may be used. A gated end 35 is provided on cargo box 11 in this embodiment as a tailgate or swing-gate through which cargo such as gravel and the like may be dumped. Gate 35 is lockable in this example when in a closed position via one of several well known methods in the art such as spring-latch, pin-bore, or hinge-lock.

In one embodiment wherein cargo is often dumped or spilled out from cargo box 11, a pin-bore locking method for gate 35 may be preferable. In another embodiment dual gate-locking methods may be employed for the convenience of the user. In some embodiments there is no gated end such as gate 35 as the requirement of a gate depends in part on the intended function or functions of cargo system 9 many variations of which will be later described.

A wheel-assembly 37 is provided at the outboard end of box 11 in this example to facilitate rolling the end of box 11 across the ground. Wheel assembly 37 has two wheels positioned on opposite sides of box 11. Wheel assembly 37 may also be a non-axled pair of wheels mounted to opposing sides of box 11. In some embodiments wheels are not needed.

Lever 23 is pivotally attatched to cargo box 11 via a pivot attachment 29. Attachment 29 is made to retain lever 23 to box 11 so that it is freely pivotal. This may be done in a number of ways known in the art. Lever 23 has an innovative function provided through a unique design allowing cargo box 11 to be pulled up and onto a tailgate without the need to physically lift the box or to otherwise manually intervene.

Lever 23 may be manufactured from a durable steel such as stainless steel. Other materials may be used to manufacture lever 23 such as aluminum or plastic so long as a suitable load strength is provided to lever 23 and the attachment to which it is pivotally attatched. Lever 23 has an identical counterpart (not shown) mounted on the opposite side of cargo box 11. The unique function of lever 23 will be described in more detail below.

Link 21 is pivotally attached on one end to lever 23 and pivotally mounted on the opposite end to a worm block 19 moved by linear translating drive 17. Mounting link 21 to lever 23 may be accomplished in a variety of ways, but preferably by a rotary bearing arrangement. Link 21 shares identical material constraints in manufacture as does lever 23. In a preferred embodiment, a high strength steel is used. As previously described with regard to lever 23, link 21 has an identical counterpart mounted on the opposite side but not seen in this view.

Worm-block 19 is an integral part of worm-gear drive 17. Worm-gear drives are well known in the art and are used as means of providing linear motion with high power input for specific components of various automated machines. Worm-dives may be operated manually via cranking or turning a handle and automatically via electric motor and gear assembly. More traditionally, the electric motor and gear assembly may be engaged (for automatic drive) or disengaged (for returning to manual operation).

For the purpose of the present invention in a preferred embodiment, there are two worm-gear drives 17 mounted on opposing side-walls of bed 15. Two worm blocks 19 are incorporated, one for each drive, and drives 17 on opposite sides of the truck bed are coordinated to operate linearly together. In this embodiment a control unit 33 is centrally mounted on the back wall of bed 15. Control unit 33 provides synchronization for each worm-gear drive so that worm blocks 19 are always held in the same location via simultaneous operation of separate drives. As is known in the art, each worm-gear has an electric motor and gear assembly.

Pickup truck 13 has a tailgate 25 that is modified in this example by the addition of a pair of roller assemblies 31 placed strategically on either side of the top edge tailgate 25. Rollers 31 may be positioned within the width of box 11 or at the position of levers 23, or both (in which case there may be more than two such rollers), to facilitate motion of the levers and the box when in contact with the tailgate. A simple locking mechanism is used in some embodiments to stabilize the tailgate, and in some embodiments additional support is provided to ensure the tailgate can sustain the loads applied during box loading and unloading. Such supports may include extensions arms to the ground to support the tailgate.

It will be apparent to one with skill in the art that the system of the present invention is not limited to pick-up trucks but may be employed with any vehicle having a cargo bay such as an El-Camino, a flat-bed style truck, or a van, for example. All that is required is suitable structure for mounting the linear translation drives. A cargo system such as cargo system 9 may also be used in covered vehicles, such as a pickup truck with a camper shell in place without departing from the spirit and scope of the present invention.

Figure 2:
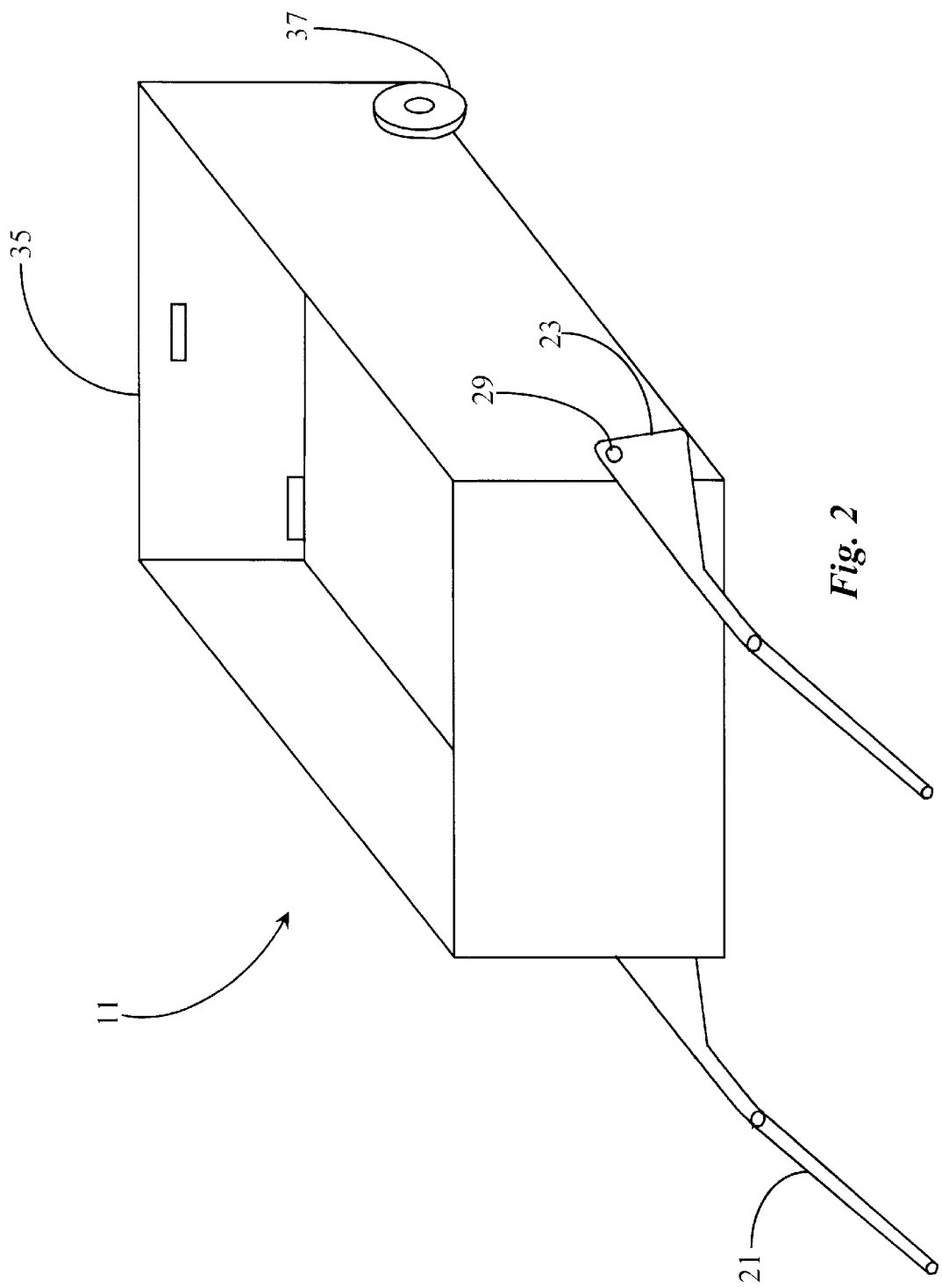
FIG. 2 is an isometric view of a multi-purpose cargo box and operating link mechanisms according to an embodiment of the present invention.

FIG. 2 is an isometric view of cargo box 11 with lever systems in place. The exact shape of cargo box 11 may vary. In one embodiment, it is rectangular and is of such a width as to fit inside a pickup bed such as bed 15 of FIG. 1 in between the wheel wells. In another embodiment of the present invention, an angled skid (not shown) is provided on the bottom-front or leading edge of box 11. Depressions may also be formed in either side of box 11 that are designed to allow box 11 to utilize the space above the wheel wells. In this way, the angled skid would cause box 11 to lift up over the wheel wells and then settle down over the wheel wells when pulled into the truck bed. Ideally, cargo boxes will be manufactured to custom fit standard truck bed designs in height, width, length, and in some cases, shape.

In some embodiments cargo box 11 has no wheels at all. In this case skids or skid structures may be provided for sliding. Wheels 37 may be polyurethane wheels designed for simple hand-truck operation, or regular trailer wheels such as may be found on a boat trailer. There are many possible variations. xxx The gated end 35 of box 11 is shown, in this example, to be hinged with a latch handle. Gate 35 may, in other embodiments, be a swing gate, a sliding gate, or hinged with a pin lock. There are many possibilities. The exact method employed in gate 35 will depend on type of use and customer preference.

In a preferred embodiment, cargo box 11 is a dual-purpose box such that one may dump cargo out of box 11 from an angled position, or lower box 11 to ground level for loading and unloading. In other embodiments, cargo box 11 may be designed with no gated end and be used specifically for recreational loading and unloading of camping gear and the like. In this case, special compartments may be added to stow special tools, fishing poles, ski equipment, etc.

Figure 3:
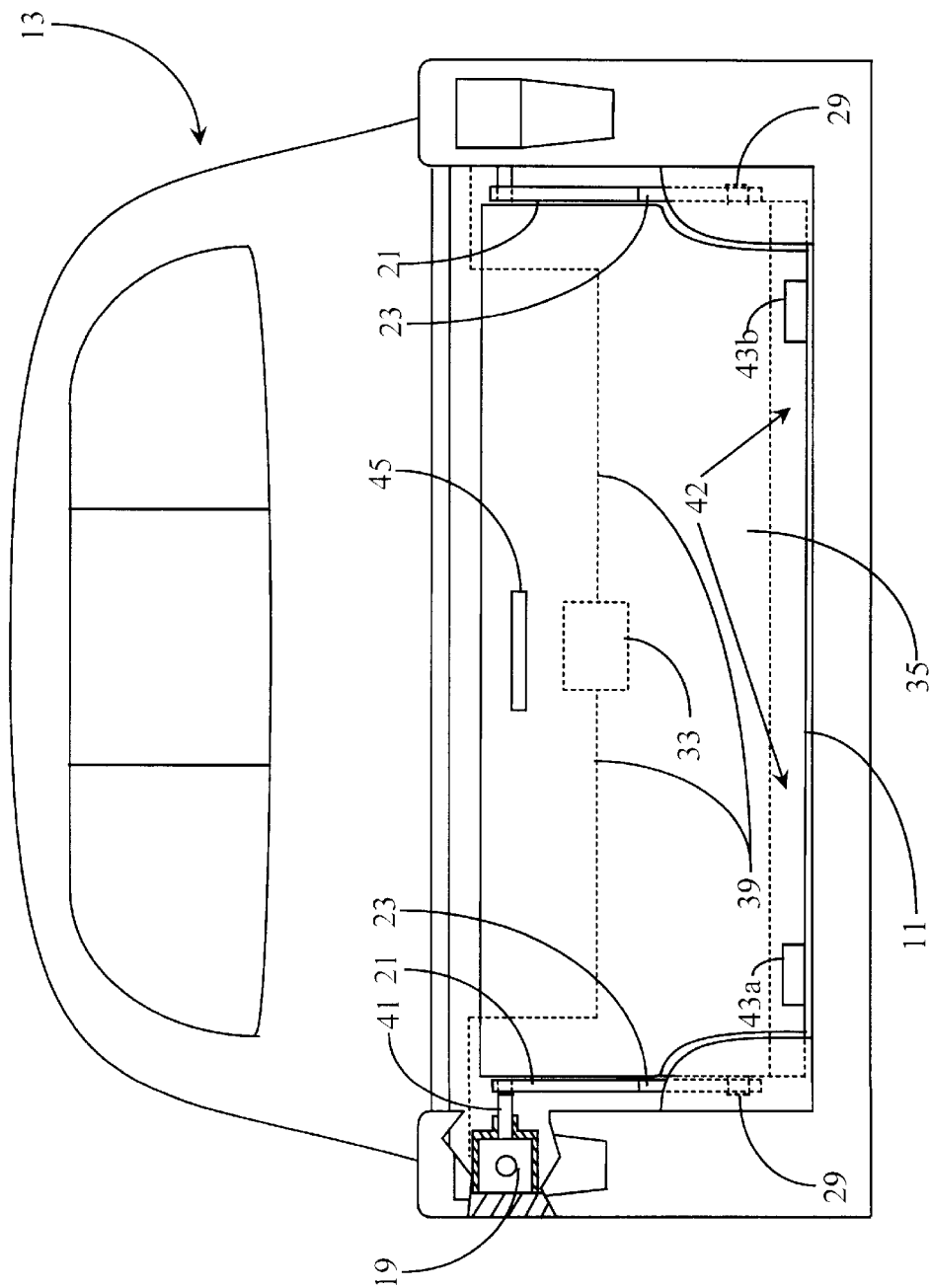
FIG. 3 is a rear view of the cargo system of FIG. 1 with the cargo box fully boarded into the bed of a pickup according to an embodiment of the present invention.

FIG. 3 is a rear view of the cargo system of FIG. 1 fully boarded into the bed of a pickup according to an embodiment of the present invention. In this example, cargo box 11 is designed to fit over the wheel wells in the bed of truck 13 although in other embodiments, it may fit in-between the wheel wells of truck bed 15. End gate 35 of box 11 has a latch handle 45 and hinges 43a and 43b. End gate 35 operates, in this example, similarly to a standard tailgate. In this example, there are no wheels on box 11. Cargo box 11 is skidded into the bed of truck 13 as briefly described with reference to FIG. 2. The anti-scratching and lubricative nature of polyurethane affords this variant possibility. In other embodiments rollers may be provided on the bottom of the box to facilitate movement of the box over the truck bed. In still other embodiments fixed rails may be provided along the sides of the truck bed, coinciding with channels , rails or the like along sides of the box, with rollers either on the box channels or the fixed rails along the sides of the truck bed. In this manner, boxes may be supported off the bottom of the truck bed and guided in channels on rollers.

Worm block 19 which is part of worm-gear drive 17 is shown in broken view in FIG. 3. A pin 41 extends from worm block 19 on each side of box 11 to a position just short of the walls of cargo box 11. Link 21 is pivotally mounted to pin 41. The mounting method may be of the form of a bushing containing ball-bearings and a retainer clip, or by other means known in the art.

Lever 23 is shown pivotally mounted to cargo box 11 at pivot location 29 on either end. Pivotal mounts 29 are provided low enough, with respect to the height of box 11, to facilitate easy lifting onto the truck bed and over the wheel wells. An angled skid feature represented by element number 42 is provided on the bottom-front edge of cargo box 11 to further aid in skidding the box over the tailgate and wheel wells. As previously described with respect to FIG. 2, box 11 may also fit entirely in-between the wheel wells. In that case, pin 41 will extend past the wheel wells.

Control unit 33 is center-mounted on the back panel of the pickup bed in this embodiment, but may be mounted in any convenient place. Power and synchronization to both worm-gear drives is provided via control unit 33 which may be activated from the cab of truck 13. In some embodiments parallel control input may be provided at the back of the truck or by a remote-control box. In one embodiment, a variable speed control may be provided and accessible to an operator from inside the cab of truck 13. It is well known in the art to provide synchronization and variable speed controls to separate worm-gear drives. Power may be supplied by a standard 12 volt battery or by an additional accessory battery.

In another embodiment, manual operation may be provided in addition to automation via a crank-handle. In this way, an operator may disengage from automatic mode and employ manual cranking. A manual crank assembly and supporting hardware (crank shaft, extenders, gears, and housing) may be mounted in a convenient location at the rear of the cab or elsewhere. A good example of when manual cranking may be employed might be when a load is extremely heavy and boarding cargo box 11 may impose undesired stress on the electric gear assembly that would normally drive the worm-gear. It is well known in the art that worm-gear drives employing both manual and automatic operation typically have crank handles.

Figure 4A:
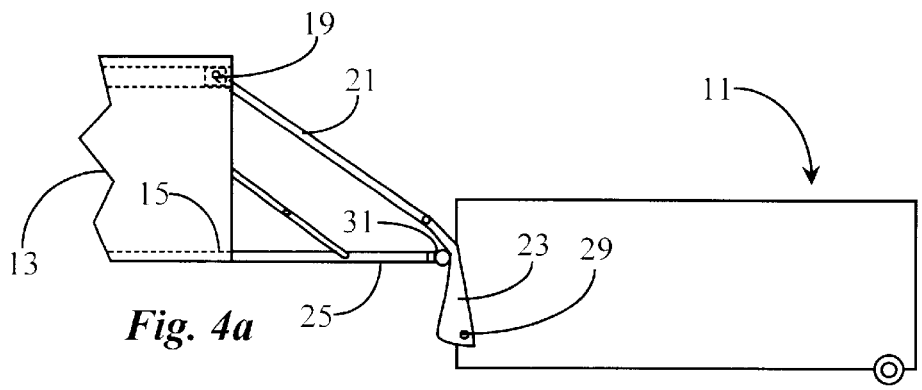
FIG. 4a is an elevation view of a portion of the cargo system of FIG. 1 fully extended with the cargo box on the ground.

FIG. 4a is an elevation view of a portion of the cargo system of FIG. 1 with box 11 fully extended and lying on the ground. Fully extended and horizontally grounded, cargo box 11 may be loaded with cargo before automatic boarding into truck bed 15. The curved shape of lever 23 and it's pivotal mount 29 allows cargo box 11 to be lifted into truck 13 by pulling action of link 21 moved by the linear drive mechanisms. Rollers 31, if used, are strategically located at the end and on either side of tailgate 25 for the purpose of making contact with lever 23 and/or the bottom of box 11. Such rollers ease the process of lifting cargo box 11 and reduce friction. Alternatively, as previously described, an angled skid such as skid 42 of FIG. 3 may be provided to cargo box 11 further easing the boarding process. Tailgate rollers may be built in to a tailgate or added, such as by clamp mechanisms to a standard tailgate.

It will be apparent to one with skill in the art that the exact dimensioning of lever 23, link 21, and cargo box 11 will depend on a number of factors attributed to the size and style of truck to which the system is fitted. Such attributes as bed height from ground level, bed length, depth of the bed, etc. will affect the design and implementation of system 9 of FIG. 1. The inventor intends to provide modular systems that are designed for varying truck sizes and styles. Further detail regarding boarding loaded cargo box 11 is provided below.

Figure 4B:
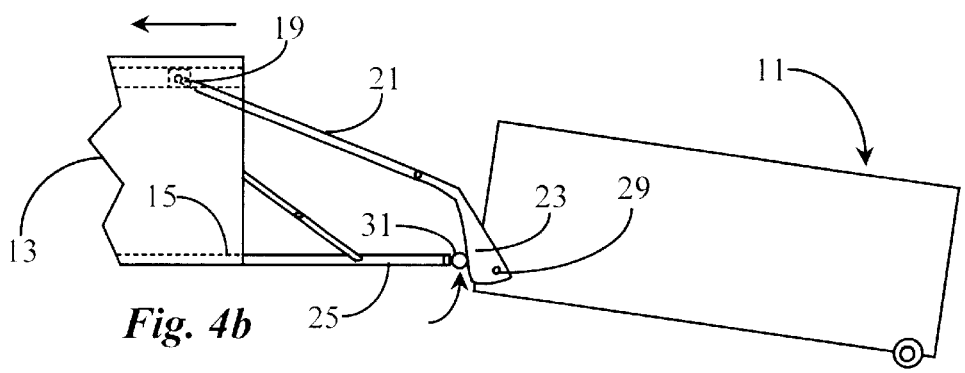
FIG. 4b is an elevation view of a portion of the cargo system of FIG. 4a with the cargo box partially boarded into a truck bed.

FIG. 4b is an elevation view of a portion of the cargo system of FIG. 4a partially boarded into a truck bed. Now with the boarding process commenced, worm block 19 is somewhat retracted toward the truck cab thus lifting box 11 up to the level of tailgate 25. Lever 23 pivots forward and rolls along rollers 31 as it is pulled, thus lifting the box toward tailgate 25 as represented by the upwardly-curved arrow. When cargo box 11 is lifted to the position wherein it's lower front edge is almost parallel to the edge of tailgate 25, lever 23 maintains primary contact with rollers 31 allowing lower edge of box 11 to pass the edge of tailgate 25 without touching.

Figure 4C:
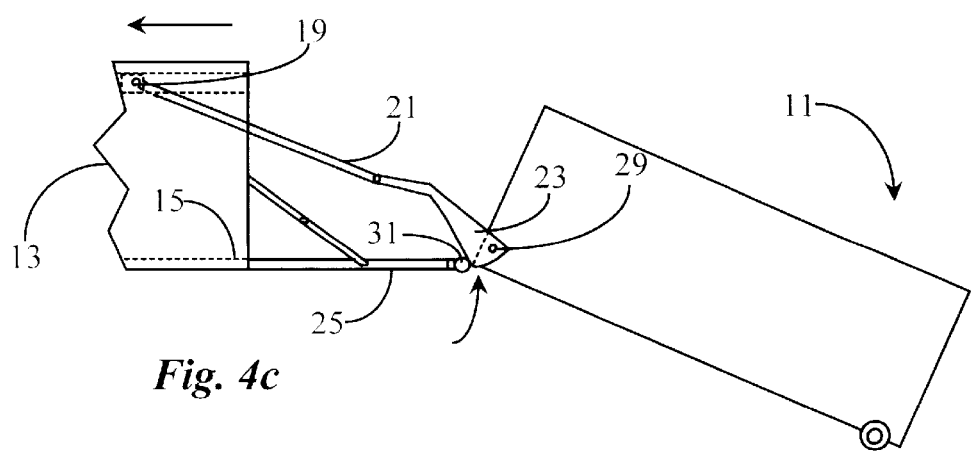
FIG. 4c is an elevation view of a portion of the cargo system of FIG. 4b with the cargo box further boarded into a truck bed.

FIG. 4c is an elevation view of a portion of the cargo system of FIG. 4b with box 11 further boarded into a truck bed. Worm block 19, retracted further toward the truck cab, has lifted cargo box 11 into a position just breaching tailgate 25. Lever 23 retains contact with rollers 31 allowing the leading lower edge of box 11 to pass tailgate 25 as previously described with reference to FIG. 4b.

Two obstacles must be overcome in the boarding process. The first obstacle of breaching the tailgate is solved via rollers 31 and the boomerang shape of lever 23 as shown and taught with reference to FIGS. 4a–4b, or by lever 23 sliding over the edge of the tailgate. The second obstacle involves retracting cargo box 11 maximally into the rear area of a truck bed.

As previously described, an innovative method and apparatus in the form of a guiding-track and stop system is provided to create a special relationship between link 21 and lever 23 that allows for maximum retraction of cargo box 11 into a truck bed.

Figure 5A:
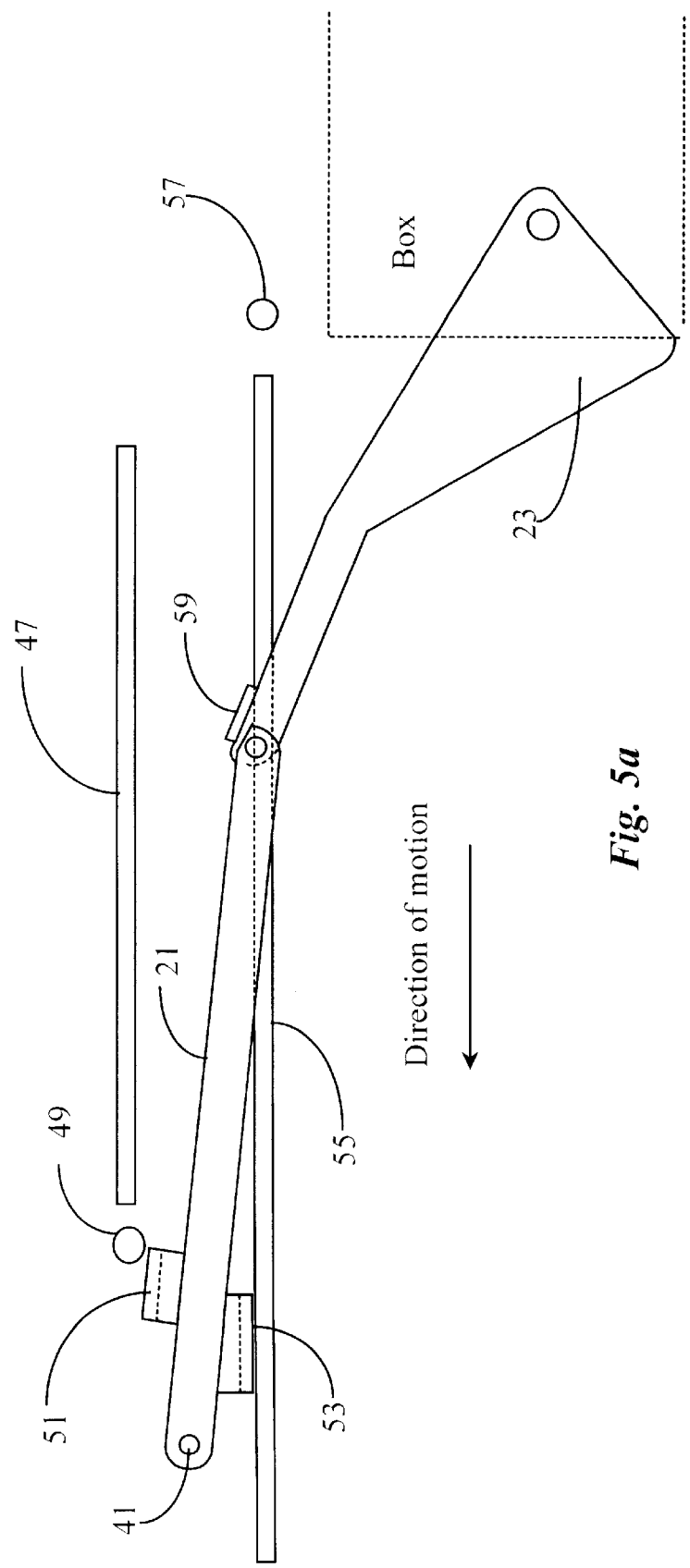
FIG. 5a is an elevation view of a guide rail system for restraining the linkage mechanism according to an embodiment of the present invention.

FIG. 5a is an elevation view of a guide track system mounted inside the truck bed on each side in conjunction with the worm gear drive, with the mechanisms shown in a first position according to an embodiment of the present invention. An upper guide track 47 is mounted above the wormdrive track. A lower guide track 55 is located just below the worm-drive track. The purpose of guide tracks 47 and 55 is to provide a means whereby the linkage apparatus comprising link 21 and lever 23 may be specifically manipulated around it's pivotal points to allow full retraction of cargo box 11 into the truck bed, and to also push the cargo box without folding the linkage mechanism.

Two guide-blocks 51 and 53 are rigidly affixed to link 21, and are designed to engage tracks 47 and 55 at certain points in operation as described below. A stop apparatus 59 is adapted at the juncture of link 21 and lever 23 in a manner to prevent link 21 from assuming a reverse pivot position as opposed to a desired forward pivot position as is also shown below. In some embodiments this stop apparatus may be adjusted to allow the link mechanism to unfold not-quite-straight, such that pushing on the mechanism will cause it to fold. In other embodiments the stop mechanism may be adjusted to allow the mechanism to unfold past straight, such that in the unfolded position gravity will operate to keep the mechanism unfolded, and a box can be pushed without folding the lever mechanism.

In FIG. 5a the direction of motion is toward the cab of the truck as illustrated by the directional arrow. At the end of this motion the worm gear drive has moved as far forward toward the truck cab as it can go. In order to further retract cargo box 11, the linkage mechanism comprising link 21 and lever 23 must be allowed to pivot and fold over by reversing the direction of worm drive 17 to a position wherein the linkage is completely folded over. By reversing the direction of worm drive 17 again, cargo box 11 may then be fully boarded with the linkage remaining in a folded position. The examples provided below illustrate this process.

Pin 49 is a retractable guide that may be extended to effectively lengthen track 47. If, from the position shown in FIG. 5a, the worm drive is activated to move pin 41 toward the right, away from the cab, if pin 49 is extended, block 51 will be guided under track 47 preventing link 21 from rotating. On the other hand, if pin 49 is retracted, link 21 may rotate and the link mechanism will fold with the box remaining stationary. The fact that the mechanism will fold is assured by stop 59, which assures that the link mechanism remains partly folded in the extended position. In this case block 51 will pass over (above) track 47 while the linkage folds, and track 47 will not impede the rotation of link 21.

After the first move pulling the box into the truck bed to the position shown in FIG. 5a, it is necessary to fold the linkage mechanism, so pin 49 is kept retracted so link 21 can rotate while the worm drive is moved away from the truck cab.

Figure 5B:
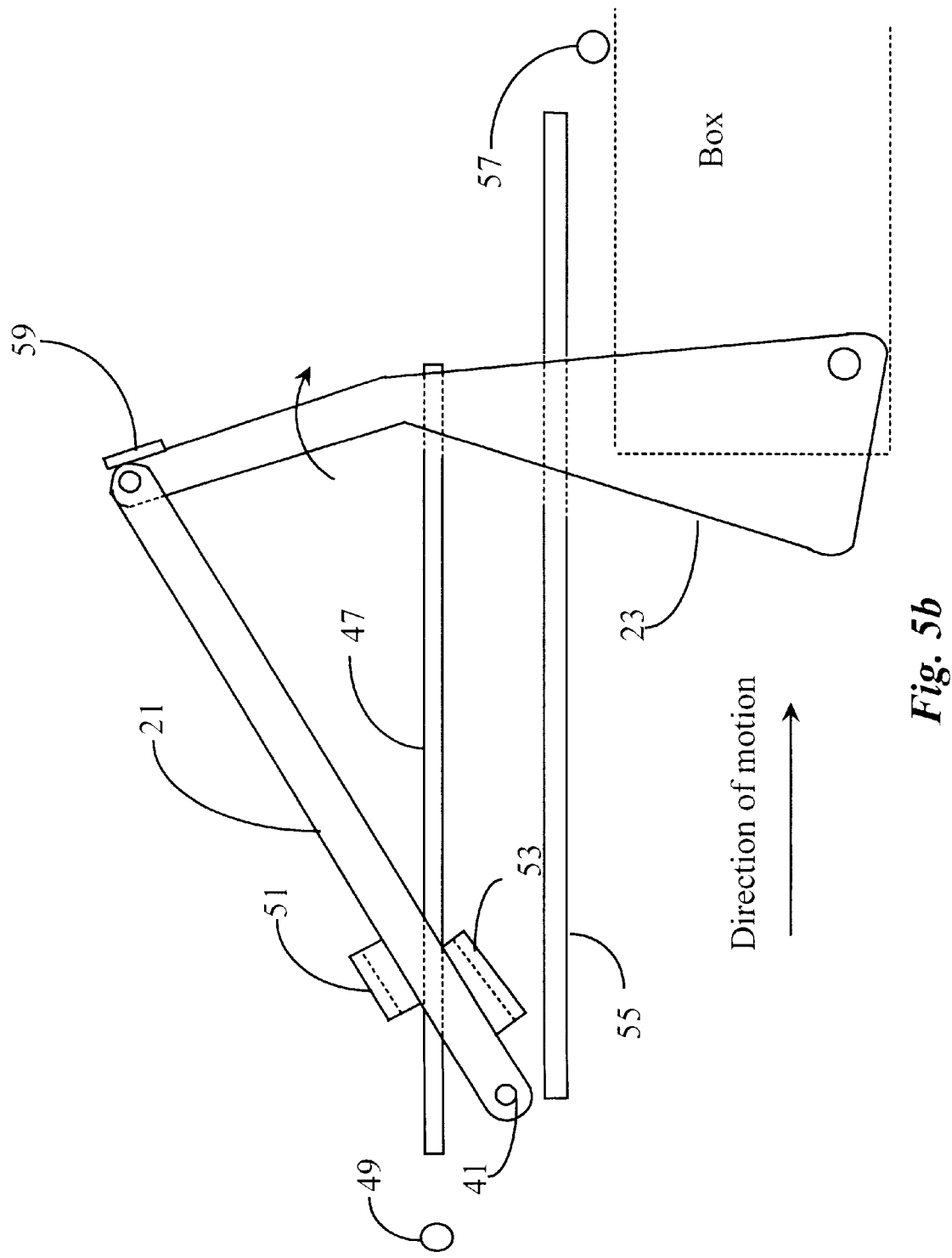
FIG. 5b is an elevation view of the guide rail system of FIG. 5a with the linkage mechanism shown in an intermediary position of folding.

FIG. 5b is an elevation view of the mechanism of FIG. 5a shown in an intermediary position with the linkage mechanism partly folded. Pin 41 is, in this example, moving away from the truck cab, driven by the worm drive, opposite to the direction of travel for drawing the cargo box up into the truck bed. The box does not move while the linkage folds. As pin 41 moves forward, link 21 and lever 23 begin to pivot upwardly as illustrated. During this folding movement cargo box 11 remains stationary because lever 23 is mounted to box 11 in a fully pivotal manner.

Neither the process in FIG. 5a wherein cargo box 11 is initially pulled in, nor the process in FIG. 5b wherein reverse direction is initiated to fold link 21 over lever 23, requires the use of guide tracks 47 or 55, or guide-blocks 51 or 53. With reference to FIG. 5a, only stop apparatus 59 is operable to insure against reverse pivoting, as previously described. The combined actions represented in FIGS. 5a and 5b utilize the natural pivotal properties of link 21 and lever 23. After the link mechanism is fully folded, the direction of worm drive 17 is reversed again in order to pull cargo box 11 maximally into the truck bed. In this operation track 55 is used with guide block 53 to keep the lever mechanism from unfolding.

Figure 5C:
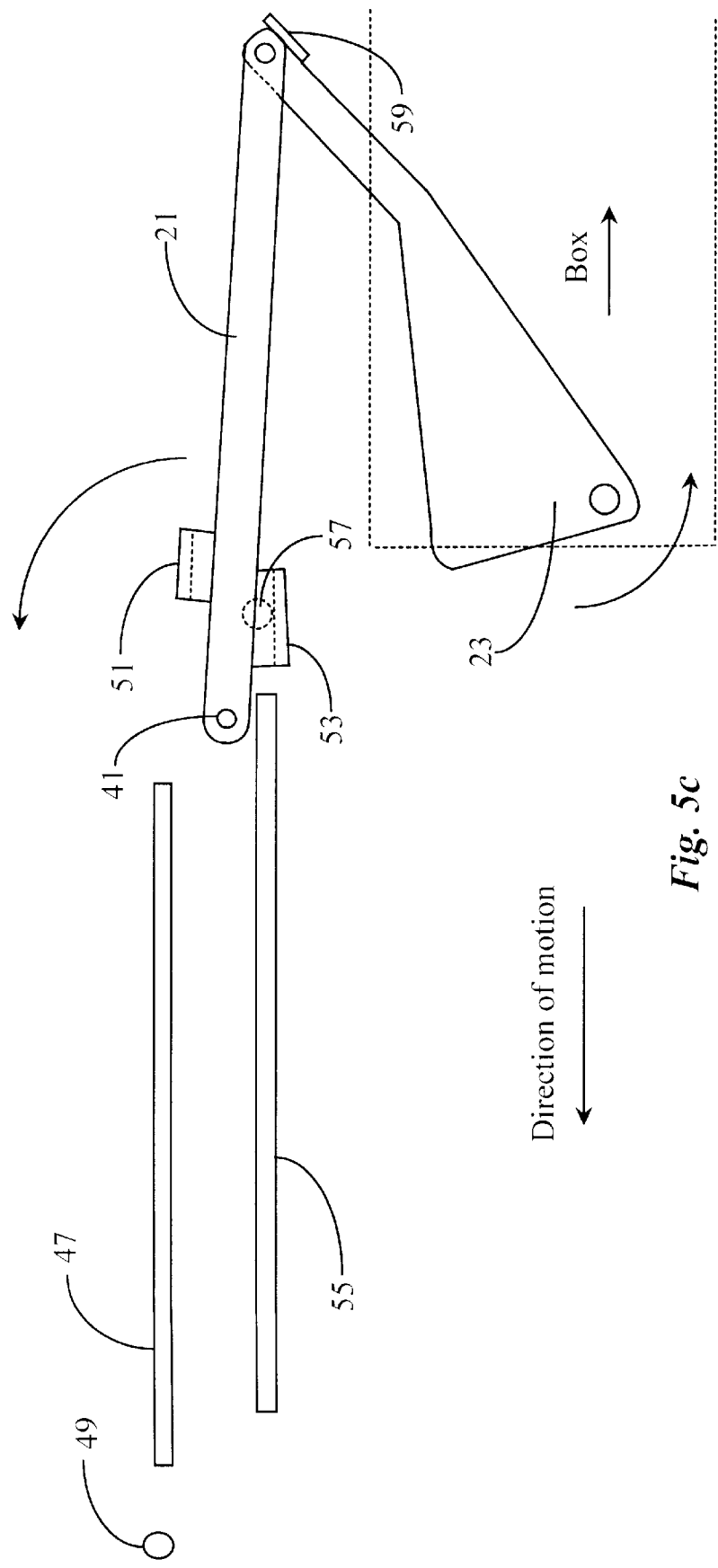
FIG. 5c is an elevation view of the guide rail system of FIG. 5a shown in a third position for full box retraction into a truck bed.

FIG. 5c shows the link mechanism at the end of the folding motion depicted by FIG. 5b. Link 21 and lever 23 are now in a fully-folded position. In this position, cargo box 11 may be maximally boarded into the truck bed with minimal space between box 11 and the cab-side bed-wall by reversing drive direction again to pull toward the truck cab.

As the mechanism folds over, block 53 clears the forward end of track 55. The direction of motion of worm drive 17 is now toward the truck cab again, and it is desired that block 53 move under track 55, restraining link 21 from rotating counterclockwise to unfold the mechanism. To ensure block 53 moving under track 55 a retractable pin 57 is activated to effectively extend track 55 to above block 53 as movement begins. Once the cargo box is moved a small distance block 53 is engaged under track 55, and pin 57 may be retracted again.

With link 21 now restrained from rotating counterclockwise by track 55 engaging guide-block 53, cargo box 11 may be maximally boarded as previously described. It will be apparent to one with skill in the art that worm-drive synchronization for the drives on opposite sides of the truck bed may be accomplished via techniques known in the art, such as by placing sensing switches along one worm drive, and operating both drives as a result.

Figure 6A:
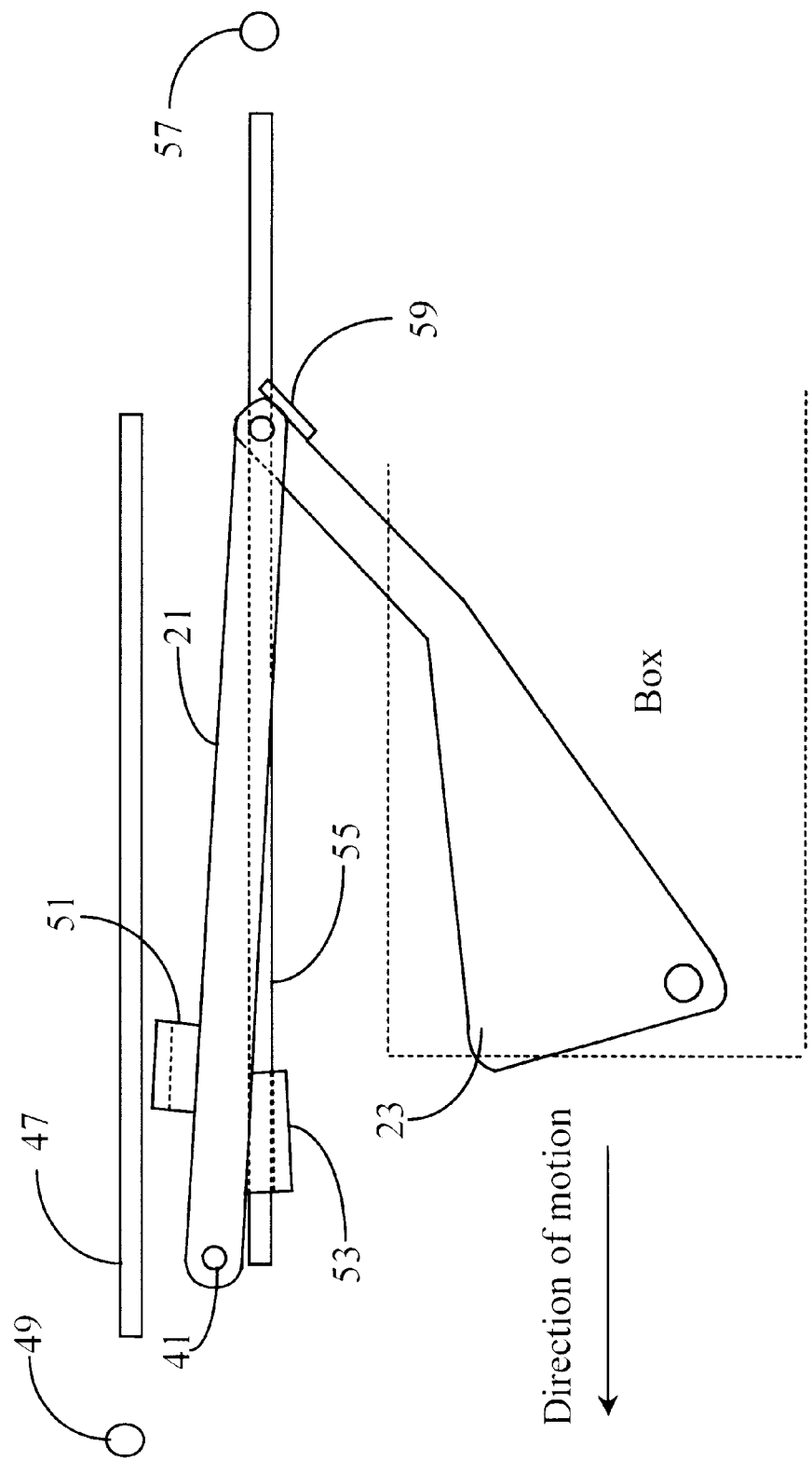
FIG. 6a illustrates an intermediate position pulling the cargo box fully into the truck bed with the linkage mechanism folded.

FIG. 6a illustrates an intermediate position pulling the cargo box fully into the truck bed with the linkage mechanism folded. After cargo box 11 is maximally boarded into the truck bed, at some point a reverse process must be implemented in order to maximally eject cargo box 11 from the truck bed where it may be lowered to ground level, tipped up vertically, used in a dumping process, or used as an extendible drawer. The first ejection motion is accomplished from the end of the previous operation simply by reversing the worm gear drive again, pushing the box out to the position shown in FIG. 5c.

Figure 6B:
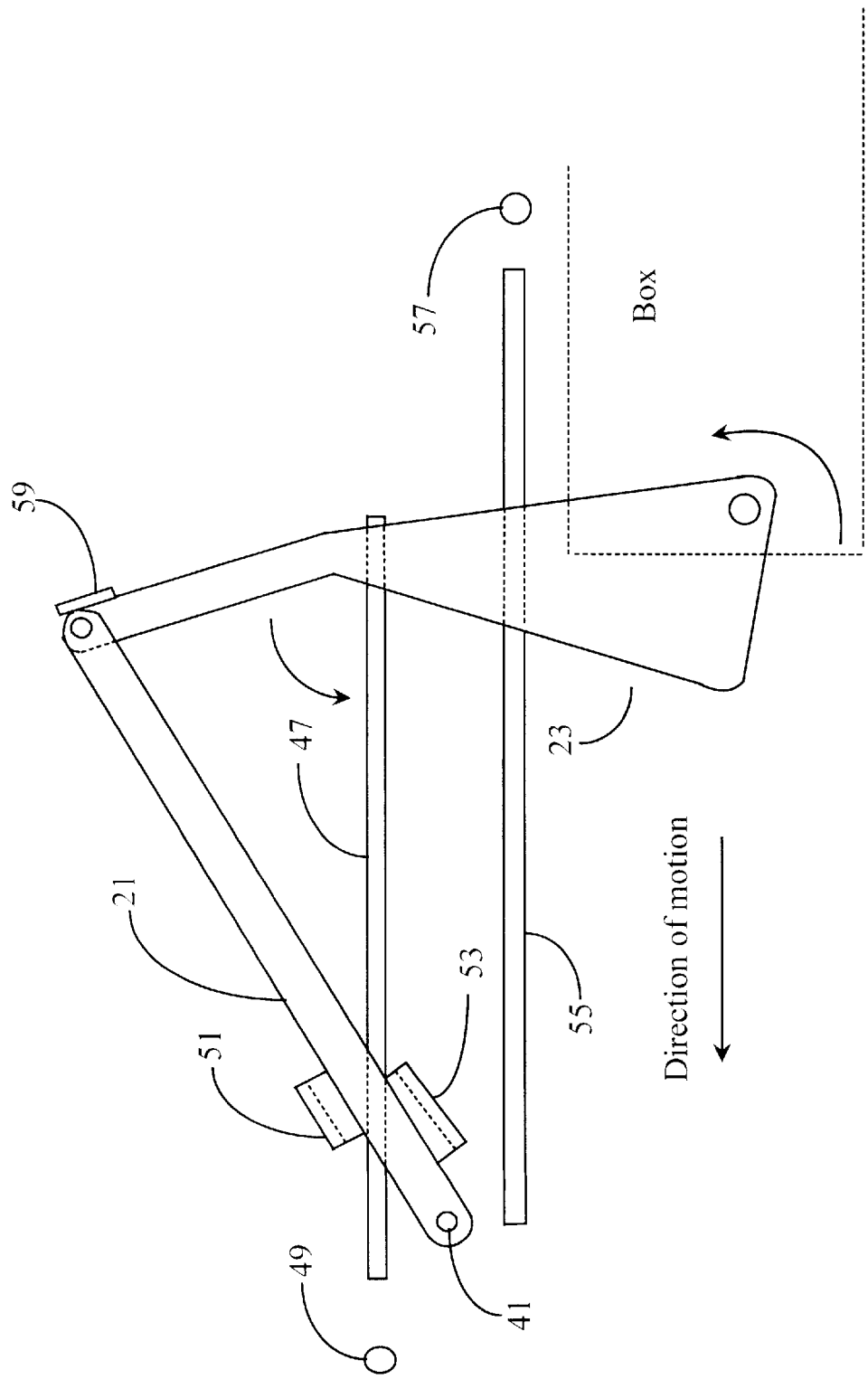
FIG. 6b is an elevation view of the guide rail system of FIG. 5a shown in an intermediary position of unfolding.

The next step is unfolding the lever mechanism. As guide-block 53 on link 21 clears track 55, worm drive 17 again switches direction toward the cab to unfold the lever mechanism. This unfolding process uses the natural pivotal properties of link 21 and lever 23. Guide-block 53 and pin 57 are not needed. The new direction of motion is toward the cab as illustrated. As the unfolding process operates, box 11 remains stationary. An intermediate position in the unfolding movement is shown as FIG. 6b. Once the lever mechanism has been unfolded, the next step is to push the box from the truck bed with the lever mechanism substantially straight.

When the lever mechanism is again fully unfolded, the position shown as FIG. 5a is again attained. This time pin 49 is extended, so as forward motion begins again, block 51 is guided under track 47, and link 21 is constrained from counterclockwise rotation.

Figure 6C:
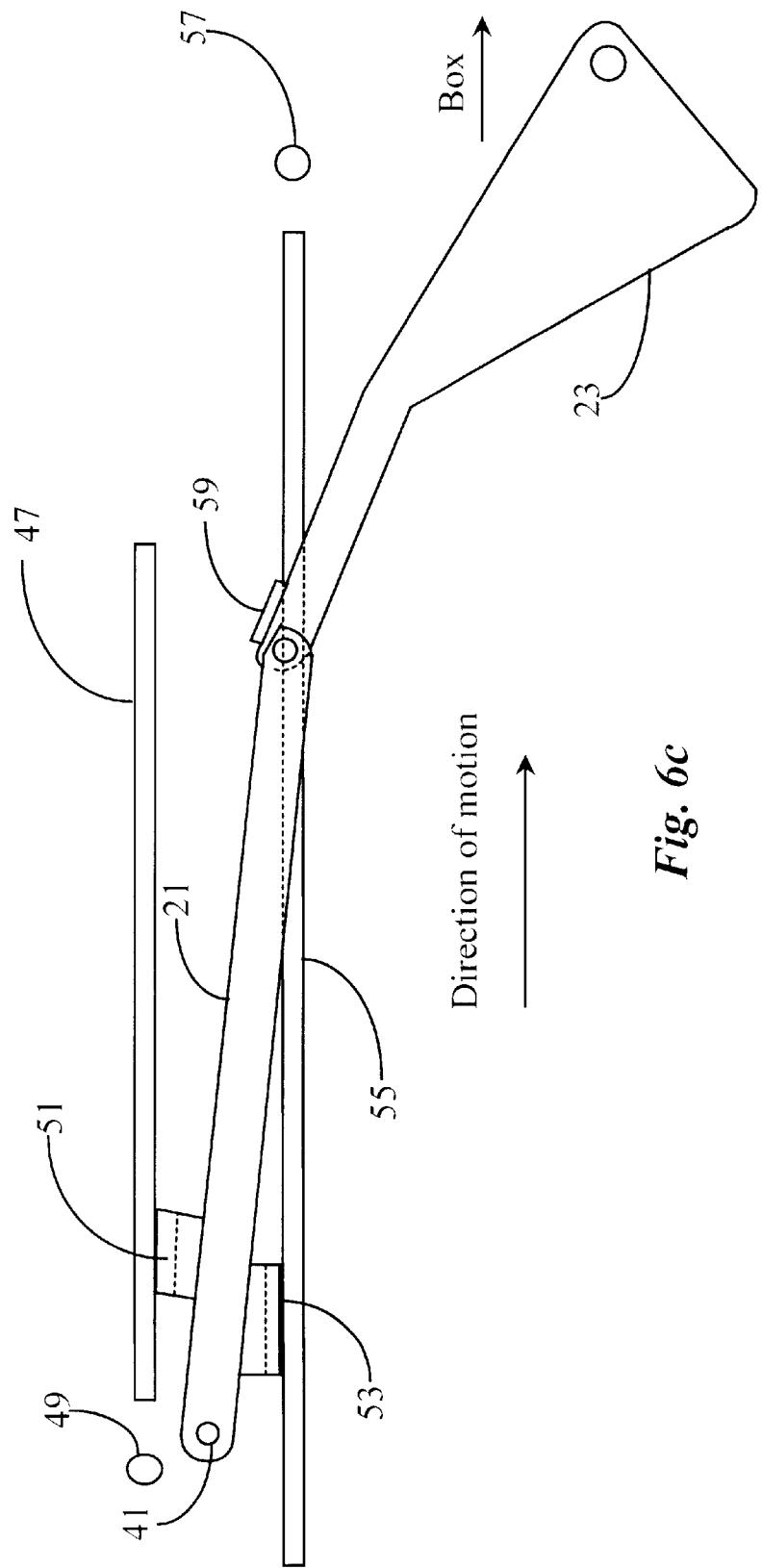
FIG. 6c shows the cargo box pushed part way toward the truck tailgate with the link mechanism unfolded and a guide block engaged.

FIG. 6c shows the cargo box pushed part way toward the truck tailgate with the link mechanism unfolded and guide block 51 engaged under guide track 47, preventing the link mechanism from folding. Guide track 47 in this embodiment is of a length to keep link 21 from rotating upward until the back of cargo box 11 is extended over the tailgate of the truck to an extent that the weight of the box causes the mechanism to remain extended.

It will be appreciated by the skilled artisan that the processes represented by FIGS. 5a–6c may be made to happen automatically via implementing the appropriate switch mechanisms at strategic locations along worm drive so that link 21 and lever 23 are in proper positions when a change of direction of worm drive 17 is initiated. The desired action is attainable by the virtue of the folding linkage. The skilled artisan will appreciate that the folding and unfolding of this mechanism and the translating actions imparted to the cargo box as a result may be made in a variety of ways within the spirit and scope of the invention.

In an alternative embodiment the actions represented by reference to FIG'S. 5a–6c may be accomplished without the use of guide tracks, guide blocks, or extendible pins. In this alternative embodiment electrically-operable clutch mechanisms are incorporated in the pivot mechanisms at the worm drive end of links 21. It will be appreciated that in all of the examples thus far given levers 21 and 23 are joined to one another, the box, and the worm blocks by freely rotatable pivots. It will also be appreciated that if the box slides or rolls along the truck bed, if one of the pivots is constrained to not rotate, then the other pivot points cannot rotate either.

Figure 7:
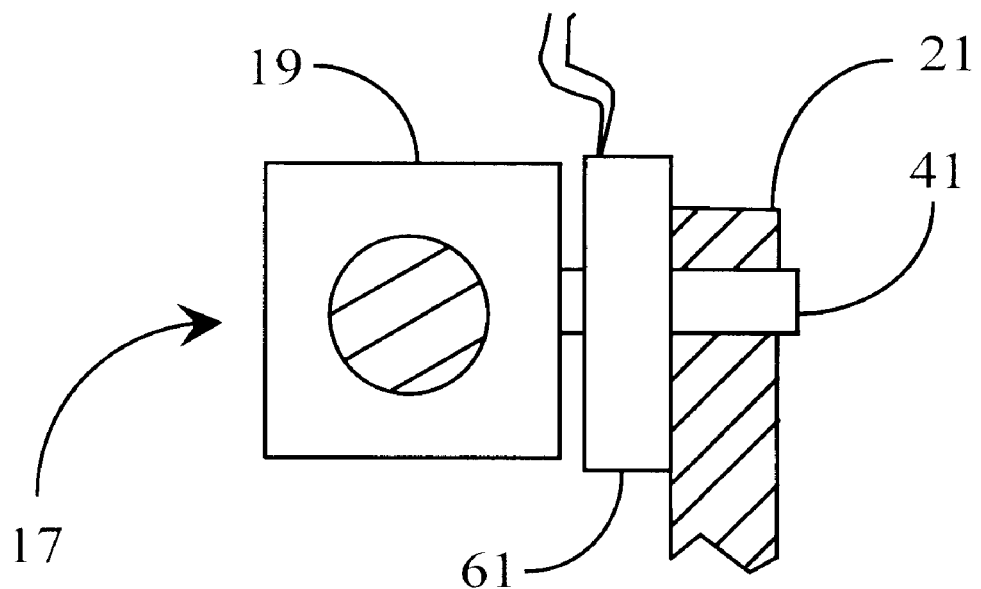
FIG. 7 is a partial section view of the worm drive on one side with a clutch mechanism added according to a preferred embodiment of the present invention.

FIG. 7 shows a partial cross-section on one side of worm drive 17 with worm-drive block 19 and pin 41 upon which link 21 typically pivots. In this embodiment an electrically-actuable clutch mechanism 61 is provided between pin 41 and link 21. The purpose of this mechanism is to constrain the pivot when the clutch is activated, preventing link 21 from pivoting on pin 41. There are a number of ways this may be accomplished with solenoid-driven mechanisms for example, using clutch plates, ratchet mechanisms, and the like. The skilled artisan, given the present teaching, will have no difficulty in providing such a mechanism to practice the invention. A second clutch mechanism 61 is provided in this embodiment at the worm-drive block on the opposite side.

As pointed out above, if the pivot at the worm-drive block is prevented from rotation, the link mechanism cannot articulate as long as the box is flat on the bed of the truck. This method and apparatus may then be used in the motions necessary to draw the box fully into the truck bed and move it partially out with the link folded. Because the clutches may be activated in any position, this method may also be used to provide other benefits. It is also true that the clutches may be provided at any of the pivot points for special purposes. The worm-drive position is preferred simply because that position is easily accessible for electrical power and control.

In some embodiments it may be preferable to restrain pivotal motion rather than completely stop such motion, in which case clutches may be used that provide frictional resistance to rotation in varying degrees.

In this embodiment, beginning with a cargo box on the ground (FIGS. 1 and 4a), the clutches are released for the action of drawing the box up into the truck bed to the position of FIG. 5a. Depending on stop 59 leaving the linkage partially folded, reversing direction will fold the mechanism. Now the clutches are engaged for drawing the box fully into the truck with the fully-folded linkage, and the clutches are also engaged to push the box part way out with the linkage folded. The clutches are released to unfold, and engaged again to push the cargo box out with the linkage unfolded. At a point after the box tips over the tailgate the clutches may be released allowing the linkage to fully articulate.

There are several functions that may be advantageously performed with the mechanisms and arrangements taught herein. To fully appreciate the variations attention is drawn to FIGS. 8a through 8e.

Figure 8A:
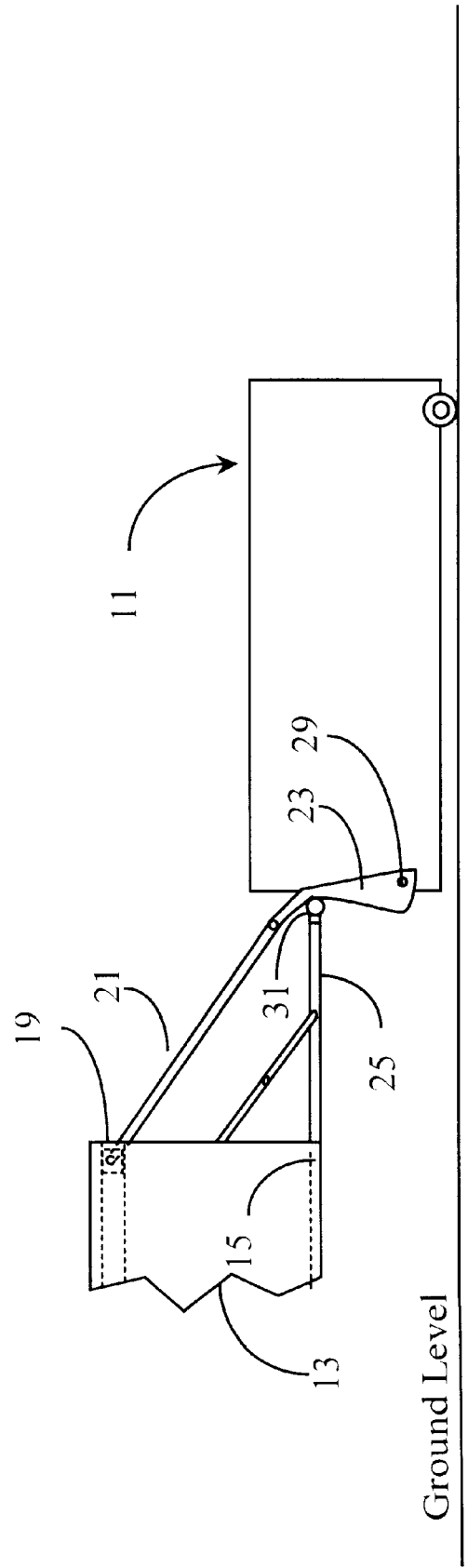
FIG. 8a shows a ground position for a cargo box in an embodiment of the invention.

FIG. 8a shows a cargo box 11 set horizontally on the ground in an embodiment of the invention. This position is aided by wheels or skids at the rear of the box, and may also be facilitated by moving the truck while lowering the box. Link 21 has to rotate for this position to be attained.

Figure 8B:
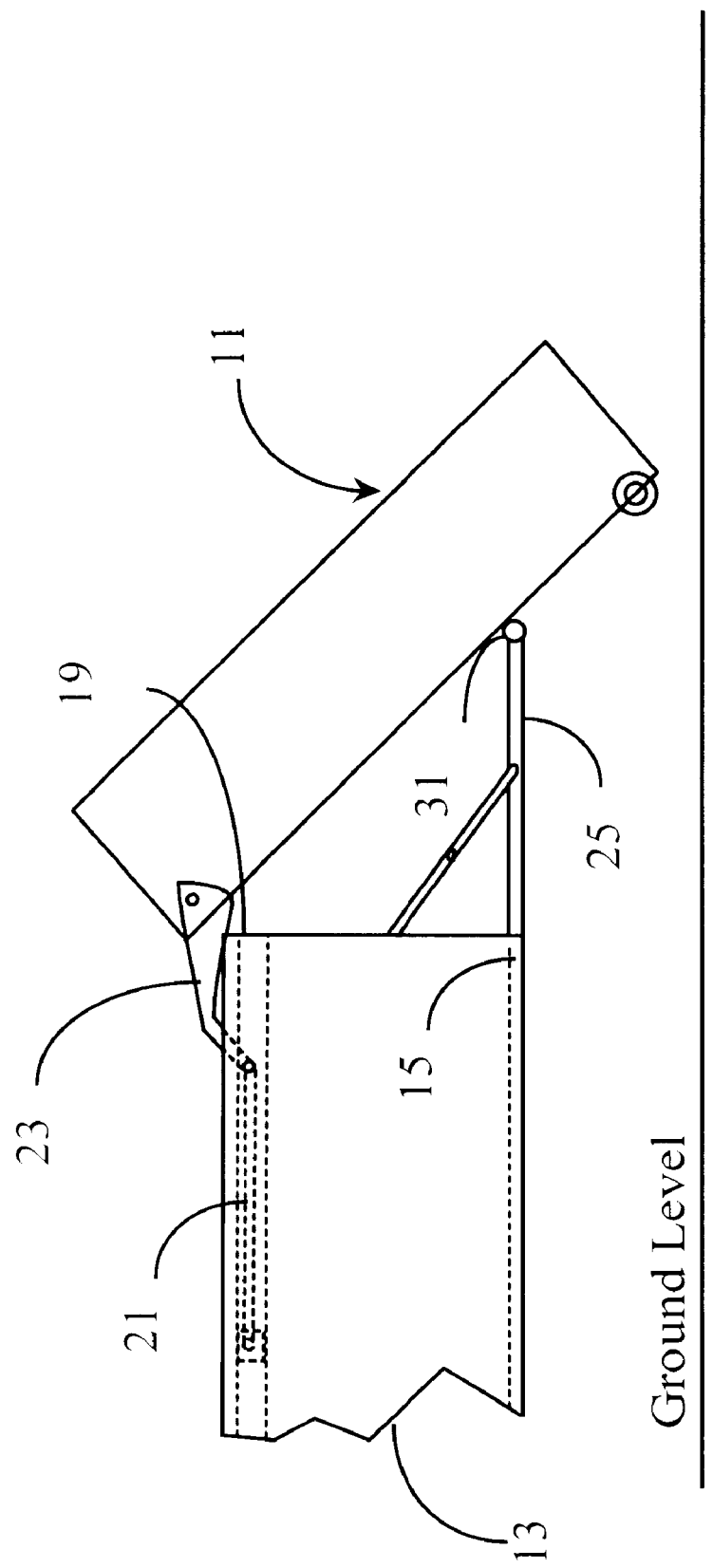
FIG. 8c shows a vertical position for a cargo box in an embodiment of the invention.
FIG. 8d shows a shelf position for a cargo box in an embodiment of the invention.

FIG. 8b shows a cargo box guided in unloading to act as a dump box, simulating the advantages of a dump truck. In this instance there are several ways that the unloading motion may be managed. In one instance, the dumping position may be considered a position attained in the process of setting a box on the ground. If the unloading motion is stopped before the box touches the ground the box is in position to dump. One may also activate clutches as described above for further control. In other embodiments the links may be guided by tracks.

Figure 8C:
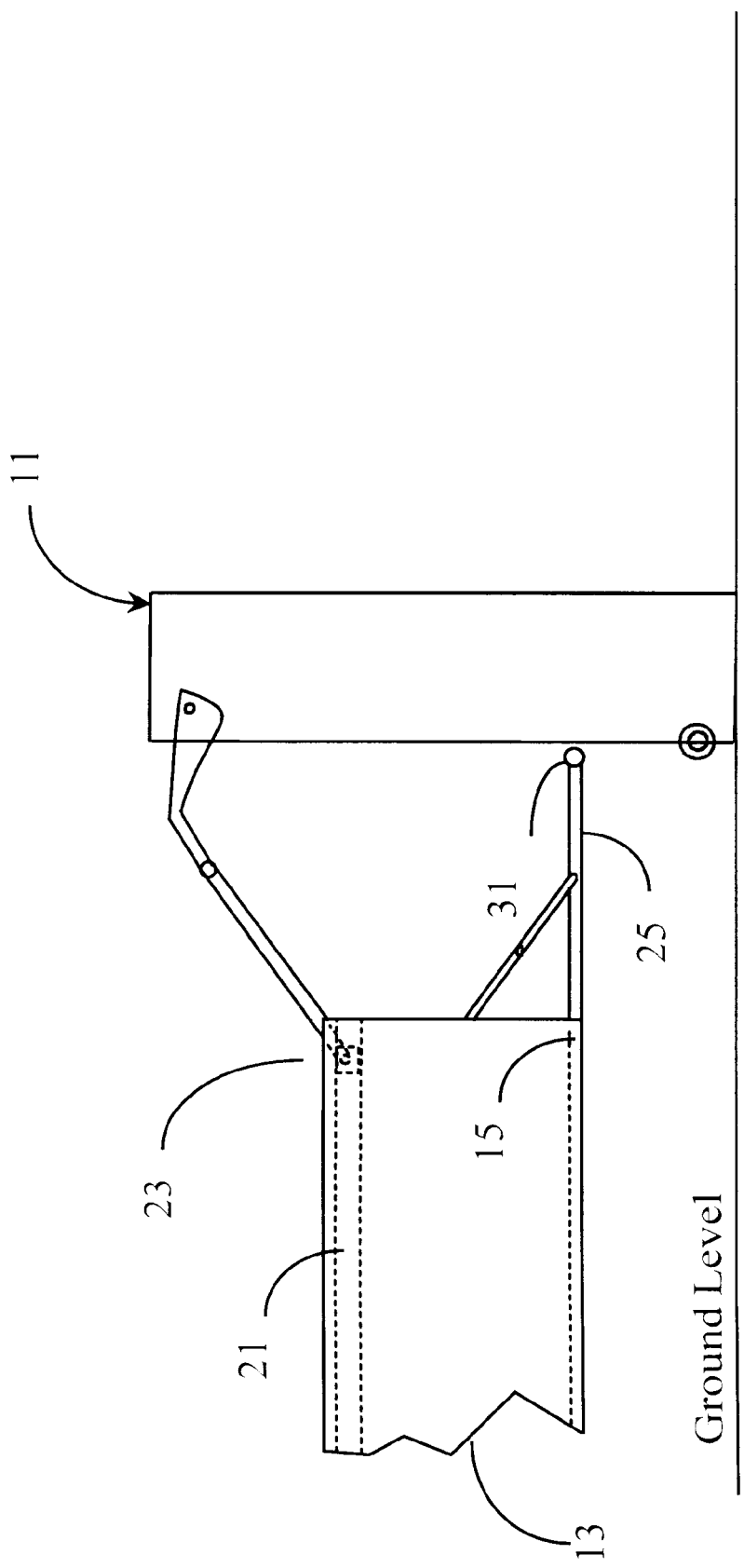

FIG. 8c shows a cargo box set up in a vertical position which is advantageous, for example, for loading and unloading heavy appliances and the like. This position can also be managed in a number of ways. For example, in some embodiments, as illustrated, there may be wheels or skids on the outboard end of the box to facilitate movement of the box in contact with the ground for placing the box flat on the ground. If these wheels are absent, and particularly if a device for making non-skid contact with the ground is provided at the back of the box, the box can be made to tilt up to the vertical position on the ground. In some cases the wheels may be made retractable. In others there may be adjustable devices made to extend beyond the radius of the wheels. In still other embodiments guide tracks and followers may be used to control the angle of the box on exit, to ensure the box sets vertically.

Figure 8D:
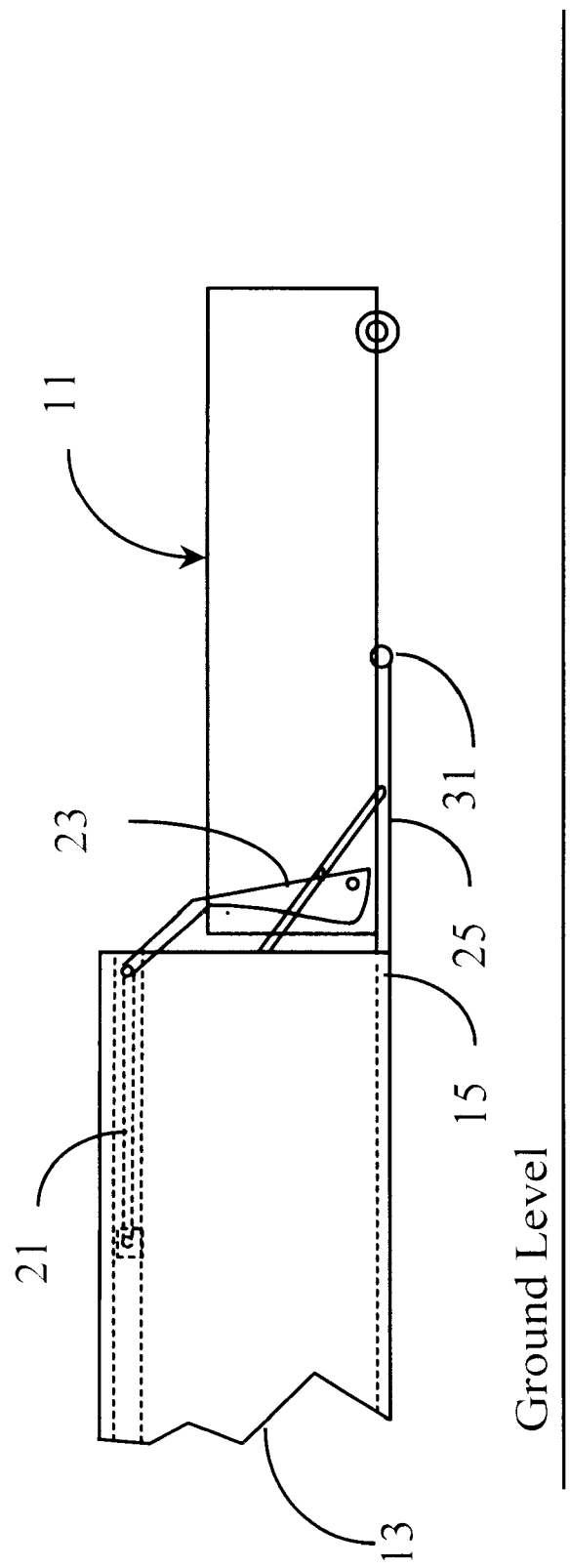

Another useful position and action for the system of the invention is to present the cargo box as a drawer over the truck tailgate. This position is illustrated by FIG. 8d, and may also be accomplished in a number of ways. In one alternative guide tracks may be provided with roller followers at the position of the pivot of levers 23 at the box. Followers at this position would come under a guide track at a selected position, preventing the box from tipping as it is extended over the tailgate. Extension tracks from the truck bed could also be provided to extend beyond the tail gate to support the box as a drawer when extended over the tailgate. Other mechanisms may be devised for the purpose.

The unique multi-cargo system of the present invention has many and varied uses from commercial to recreational. Such a modular system may be retrofitted and customized to fit virtually any type of vehicle supporting a platform or pickup style bed. In one embodiment a flatbed truck may be fitted with the system of the present invention. The worm drive and associated apparatus may be mounted to a beam or rail type architecture mounted to the truck bed.

In still another embodiment, a recreational platform may be provided of similar configuration to the bottom of cargo box 11 having the same pivotal mounts, wheels, and the like. Mounting apparatus provided on the platform may be designed to facilitate the mounting of recreational vehicles such as dirt bikes, jet skis, mountain bikes, a small boat, etc. In this way, such recreational vehicles may be loaded in automated fashion as taught in previous embodiments. Such a platform may also have a structure near the front portion supporting notches as described with reference to FIG'S. 8 and 9 for use with rod 61 of FIGS. 7–9.

In still another embodiment representing a recreational use, cargo box 11 may double as a small one or two man boat. There are many possibilities.

Cargo box 11 may be provided with a lid or covering, and may be used in conjunction with a camper shell without departing from the spirit and scope of the present invention. In one embodiment, a lockable lid has an angled groove similar to notches 63 and 65 described with reference to FIGS. 7–9. Such a box with covering locked into place may be boarded and un-boarded via the rod and notch system of FIG. 7. In many embodiments detachable mounts are provided at the cargo box for levers 23, so boxes may be unloaded and left, while different boxes may be loaded and carried away.

It will be appreciated by those with skill in the art that there are many alterations that may be made in the embodiments taught herein without departing from the spirit and scope of the invention. There is, for example, a broad range of materials that may be used for various components. There are also many dimensional changes that might be made while preserving the unique folding-link arrangement of apparatus in the system. There are likewise many methods of power and control from which an artisan might select to practice the invention. The scope of the invention is limited only by the claims which follow.

What is claimed is:

1. A modular cargo system for a truck-style vehicle having a bed with a length from a cab end to a tail end, and a width between first and second sides, the cargo system comprising:

a cargo box having first and second sides substantially parallel with the direction of the length of the truck bed, a first box end disposed toward the cab end of the truck bed, a second box end facing in the direction of the tail end of the truck bed, and a bottom and a top, the cargo box adapted to fit within the length and width of the truck bed;

a first linear translating drive mounted along the first side of the truck bed and adapted to translate a first pivot block along substantially the length of the truck bed;

a first dual-link mechanism having a first link with a first and a second end, the first end of the first link pivotally mounted to the translating first pivot block, a second link having a first and a second end, the first end of the second link pivotally connected to the second end of the first link, and the second end of the second link pivotally connected to the first side of the cargo box adjacent the first box end facing toward the cab end of the truck bed and nearer the bottom of the cargo box than the top;

a second linear translating drive mounted along the second side of the truck bed and adapted to translate a second pivot block along substantially the length of the truck bed; and a second dual-link mechanism mirroring the first dual link mechanism, and pivotally mounted to the translating second pivot block, and the second side of the cargo box opposite the pivotal mounting of the first dual link mechanism to the first side of the cargo box;

wherein the translating drives are adapted to translate the translating pivot blocks together in unison, the unfolded length of the dual link mechanisms is sufficient to allow the cargo box to rest horizontally at ground level behind the truck bed with the translating pivot blocks positioned at the tail end of the truck bed, and wherein the second links of the dual link mechanisms are shaped such that as the translating drives move the translating pivot blocks toward the cab end from the tail end, the second links bear on the tail end of the truck bed, raising the cargo box until the first box end clears the tail end of the truck bed, and further translation toward the cab end of the truck bed pulls the cargo box over the tail end of the truck bed until the cargo box rests in the truck bed.

2. The cargo system of claim 1 wherein the translating drives are worm gear drives driven by electrical motors.

3. The cargo system of claim 1 wherein the translating drives are adapted, after pulling the cargo box up into the truck bed, to translate toward the tail end with the cargo box stationary, and fold the dual link mechanisms to a predetermined position, and to then translate toward the cab end, pulling the cargo box maximally into the truck bed.

4. The cargo system of claim 3 wherein, during the pulling-in with the dual-link mechanisms folded, a guide rail system is employed to ensure that the dual-link mechanisms remain folded.

5. The cargo system of claim 3 wherein, after the pulling-in with the dual-link mechanisms folded, the translating drives are adapted to move toward the tail end with the dual-link mechanisms folded, pushing the cargo box toward the tail end to a pre-determined position.

6. The cargo system of claim 5 wherein, after pushing the cargo box to the predetermined position with the dual-link mechanisms folded, the translating drives are adapted to move toward the cab end with the cargo box stationary, unfolding the dual-link mechanisms.

7. The cargo system of claim 6 wherein, after unfolding the dual-link mechanisms the translating drives are adapted to move toward the tail end, pushing the cargo box from the truck bed while maintaining the dual-link mechanisms unfolded.

8. The cargo system of 7 wherein a guiding track is employed engaging a guide block on the first links of the dual-link mechanisms to constrain the first links from rotating, thereby keeping the dual-link mechanisms unfolded.

9. The cargo system of claim 1 further comprising clutch mechanisms at the pivot blocks of the translating drives, the clutch mechanisms adapted, when engaged, to oppose rotation of the first links of the dual-link mechanisms.

10. The cargo system of claim 1 wherein the dual-link mechanisms include stop apparatus to limit the range of rotation of the first and second links relative to one another.

11. The cargo system of claim 1 wherein attachment of the dual-link mechanisms to the cargo box is by quick-release apparatus, allowing the dual-link mechanisms to be quickly disconnected to leave an unloaded cargo box on the ground.

12. The cargo system of claim 1 wherein, in the act of pushing the cargo box from the truck bed, apparatus is included and employed to select among three unloading operations, a first ejecting the cargo box and lowering it to ground level to a horizontal position, a second ejecting the cargo box while rotating it ninety degrees and causing it to be positioned vertically at ground level, and a third ejecting the cargo box as a drawer from the truck bed, the cargo box remaining at the height of the truck bed and extending partially past the tail end of the truck bed.

13. A cargo box loading and unloading system for a truck-style vehicle having a bed with a length from a cab end to a tail end, and a width between first and second sides, the cargo system comprising:

a first linear translating drive mounted along the first side of the truck bed and adapted to translate a first pivot block along substantially the length of the truck bed;

a first dual-link mechanism having a first link with a first and a second end, the first end of the first link pivotally mounted to the translating first pivot block, a second link having a first and a second end, the first end of the second link pivotally connected to the second end of the first link, and the second end of the second link adapted to be pivotally connected to a pivot point on a cargo box;

a second linear translating drive mounted along the second side of the truck bed and adapted to translate a second pivot block along substantially the length of the truck bed; and a second dual-link mechanism mirroring the first dual link mechanism, and pivotally mounted to the translating second pivot block;

wherein the translating drives are adapted to translate the translating pivot blocks together in unison, the unfolded length of the dual link mechanisms is sufficient to allow a cargo box to rest horizontally at ground level behind the truck bed with the translating pivot blocks positioned at the tail end of the truck bed and connected to the cargo box, and wherein the second links of the dual link mechanisms are shaped such that as the translating drives move the translating pivot blocks toward the cab end from the tail end, the second links bear on the tail end of the truck bed, raising a connected cargo box until an advancing end of the box clears the tail end of the truck bed.

14. The cargo box loading and unloading system of claim 13 wherein the translating drives are worm gear drives driven by electrical motors.

15. The cargo box loading and unloading system of claim 13 wherein the translating drives are adapted, after pulling a cargo box up into the truck bed, to translate toward the tail end with the cargo box stationary, and fold the dual link mechanisms to a predetermined position, and to then translate toward the cab end, pulling the cargo box maximally into the truck bed.

16. The cargo box loading and unloading system of claim 15 wherein, during the pulling-in with the dual-link mechanisms folded, a guide rail system is employed to ensure that the dual-link mechanisms remain folded.

17. The cargo box loading and unloading system of claim 15 wherein, after the pulling-in with the dual-link mechanisms folded, the translating drives are adapted to move toward the tail end with the dual-link mechanisms folded, pushing a connected cargo box toward the tail end to a predetermined position.

18. The cargo system of claim 17 wherein, after pushing a cargo box to the predetermined position with the dual-link mechanisms folded, the translating drives are adapted to move toward the cab end with the cargo box stationary, unfolding the dual-link mechanisms.

19. The cargo system of claim 18 wherein, after unfolding the dual-link mechanisms the translating drives are adapted to move toward the tail end, pushing a connected cargo box from the truck bed while maintaining the dual-link mechanisms unfolded.

20. The cargo box loading and unloading system of claim 19 wherein a guiding track is employed engaging a guide block on the first links of the dual-link mechanisms to constrain the first links from rotating, thereby keeping the dual-link mechanisms unfolded.

21. The cargo box loading and unloading system of claim 13 further comprising clutch mechanisms at the pivot blocks of the translating drives, the clutch mechanisms adapted, when engaged, to oppose rotation of the first links of the dual-link mechanisms.

22. The cargo system of claim 13 wherein the dual-link mechanisms include stop apparatus to limit the range of rotation of the first and second links relative to one another.

23. The cargo box loading and unloading system of claim 13 wherein attachment of the dual-link mechanisms to a cargo box is by quick-release apparatus, allowing the dual-link mechanisms to be quickly disconnected to leave an unloaded cargo box on the ground.

24. The cargo box loading and unloading system of claim 13 wherein, in the act of pushing a cargo box from the truck bed, apparatus is included and employed to select among three unloading operations, a first ejecting the cargo box and lowering it to ground level to a horizontal position, a second ejecting the cargo box while rotating it ninety degrees and causing it to be positioned vertically at ground level, and a third ejecting the cargo box as a drawer from the truck bed, the cargo box remaining at the height of the truck bed and extending partially past the tail end of the truck bed.

25. A method for loading a cargo box having a bottom, two opposite sides, a front end, and a back end from a position horizontal at ground level to resting in a truck bed having a width greater than that of the cargo box, the truck bed having a length between a cab end and a tail end, the method comprising steps of:

(a) equipping the cargo box with detachable pivot mounts on the opposite sides, proximate the front end and the bottom;

(b) equipping the truck bed with first and second translating drives on opposite sides of the truck bed, the translating drives moving, substantially along the length of the truck bed, first and second translating blocks pivotally connected to first and second dual-link mechanisms each having a first link with a first and a second end, the first end of the first link pivotally mounted to the corresponding translating block, a second link having a first and a second end and an especial shape, the first end of the second link pivotally connected to the second end of the first link, and the second end of the second link adapted to be pivotally connected to the pivot mounts on the cargo box;

(c) connecting the second ends of the second links of the dual-link mechanisms to the pivot mounts on the cargo box; and (d) moving the translating blocks toward the cab end of the truck bed via the translating drives, the especial shape of the second links adapted to guide over the tail end of the truck bed, lifting the cargo box until the front end of the cargo box clears the tail end of the truck bed, the cargo box then bearing on and moving over the tail end of the tuck bed until the cargo box is rests horizontally on the truck bed.

* * * * *